July 8, 1924.  
J. D. HARRIS  
TUBE CUTTING APPARATUS  
Filed May 9, 1921
1,500,127
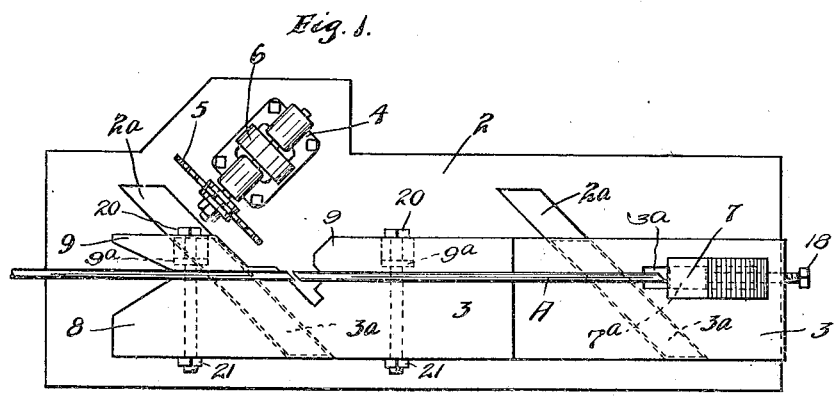
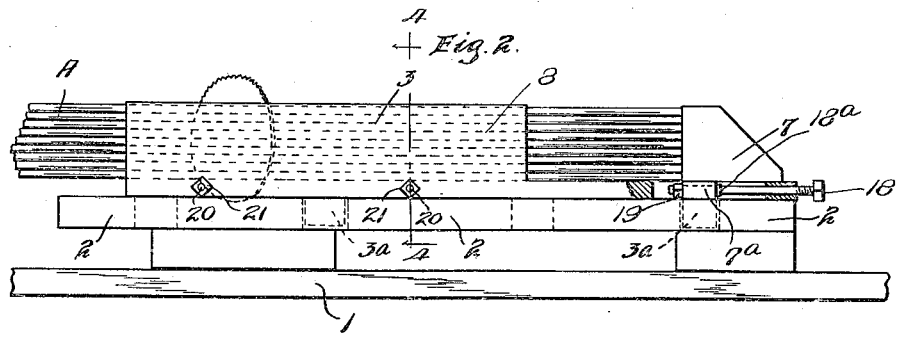
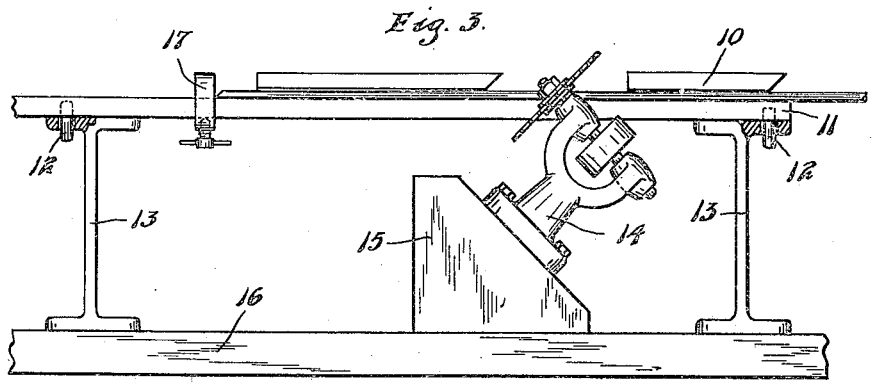
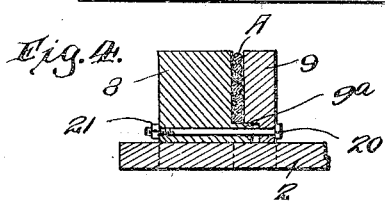
INVENTOR.  
JOSEPH D. HARRIS.  
BY HIS ATTORNEY  
James F. Williamson Patented July 8, 1924.

1,500,127

UNITED STATES PATENT OFFICE.

JOSEPH D. HARRIS, OF DETROIT, MICHIGAN, ASSIGNOR TO McCORD MANUFACTURING COMPANY, OF DETROIT, MICHIGAN, A CORPORATION OF NEW YORK.

TUBE-CUTTING APPARATUS.

Application filed May 9, 1921. Serial No. 467,863.

*To all whom it may concern:*

Be it known that I, JOSEPH D. HARRIS, a citizen of the United States, residing at Detroit, in the county of Wayne and State of Michigan, have invented certain new and useful Improvements in Tube-Cutting Apparatus; and I do hereby declare the following to be a full, clear, and exact description of the invention, such as will enable others skilled in the art to which it appertains to make and use the same.

This invention relates to a method and apparatus for cutting cylindrical members in lengths with their ends extending at an angle to the longitudinal axes thereof.

The invention is particularly directed to cutting small tubes used in the manufacture of automobile radiators. The tubular radiator is recognized as a very desirable and efficient form but in assembling and perfecting the radiators, great difficulty has been experienced on account of the solder which is used to hold and render the tubes watertight collecting at the ends of the tubes and stopping up said ends. This usually occurs when the tube is being perfected after inspection and such stopping in the tubes will retain the water when the radiator is drained and the tubes will be bursted in cold weather. It has been found that this difficulty can be avoided by cutting the tubes with the ends extending at an angle to the axes. In such a tube the solder runs down to the point formed on the tube and drops off. This is caused by the decreased capillary tendency and the lessening of cohesion of the drop of solder to the tube. It has been customary to saw the tubes by placing the ends thereof against a gauge, the surface of which was parallel with a cutting saw, then moving the tubes or saw to sever the same. To cut the tubes at an angle with such an arrangement, the tubes would have to be placed at an angle to the surface of the gauge and it will be at once apparent that if some of the tubes turned and did not bear against the surface of the gauge with their extreme points the tubes would be sawed of different lengths when moved against the saw. This has resulted in the loss of a large number of imperfectly cut tubes.

It is an object of this invention therefore to provide an apparatus and method of cutting the tubes whereby all of the tubes will be cut to the proper length and by means of which it will not be possible for a tube to turn and be improperly cut.

This and other objects and advantages of the invention will fully appear from the following description made in connection with the accompanying drawings in which like reference characters refer to the same parts in the different views and in which, Fig. 1 is a plan view of one form of apparatus used;

Fig. 2 is a view in side elevation of the same;

Fig. 3 is a view in side elevation of a modified arrangement of the apparatus, and Fig. 4 is a vertical section taken on the line 4—4 of Fig. 2, as indicated by the arrows.

Referring to the drawings, the device comprises a supporting member 1 upon which is mounted upon spaced legs or other support, a table 2. Upon this table is mounted a movable tube carrying device 3 provided with depending guide members $3^a$ arranged to travel in and be guided by slots $2^a$ formed in the table. Secured to the support 1 in a bearing member 4 is a saw 5 secured to a shaft journaled in the bearing 4 which shaft is provided with a suitable driving pulley 6 which may be connected with a driving belt for turning the saw. The tube carrier 3 comprises a gauge member 7 preferably arranged for longitudinal adjustment, and a pair of tube holding devices 8 and 9. While various forms of adjusting means for the gauge members 7 may be used, the same is illustrated as having a portion $7^a$ slidable in the slot $3^a$ in table 3. A screw 18 is journaled in the portion $7^a$ being held from longitudinal movement therein by a collar $18^a$ on said screw and a nut 19 thereon. The screw 18 engages a threaded bore in the end of the table 3 so as to be traversed longitudinally in said table upon being turned. The gauge 7 is thus movable longitudinally with said screw. The members 8 and 9 are relatively movable and may be provided with means to cause the same to move toward and from each other to bring the same into proper tube holding position. These members may also, of course, be provided with suitable clamping means if it is desired to clamp the tubes in their assembled positions therein. While the members 8 and 9 will be variously moved, one simple form of relatively moving the same is to have screws 20 extending through the lower portions of the member 8 which projects upward from the table 3 and through the lower part of the members 9. When the nut 21 is tightened on the screw 20, the members 8 and 9 will be drawn together to clamp the tubes or circular members A tightly therebetween. The members 9 are provided with tongues 9ª which slide in slots formed in the member 8. It will be noticed that by means of members 8 and 9, the tubes are held in vertically super-posed position in a row and that the tubes are also held with their axes substantially perpendicular to the gauging surface of the gauge 7. It will also be noted that the saw or cutting element 5 is arranged with its cutting edge at an angle to the longitudinal axis of tubes, which angle will be the desired angle for the ends of the tubes.

With this construction, the tubes are assembled, as shown, between the members 8 and 9 with the point of the inclined end in contact with the gauge 7. The holding member 3 can now be moved relatively to the table 2 and support 1, and will move the tubes against the saw 5 and the same will have their ends cut at the desired angle. With this arrangement, of having the saw at an angle to the axes of the tubes and having the gaging surface perpendicular thereto, it will be seen that even though some of the tubes should turn on their axes, all of the tubes will be cut to the same length.

In Fig. 3, a modified form of apparatus is shown in which the tubes are held in a horizontally disposed row by the member 10 in contact with the movable table 11 which moves in a manner similar to the tube support 3 above described and is provided with guiding means 12 moving in slots in the spaced supports 13. The saw in this arrangement is disposed with its plane of cut at an angle to the vertical and is supported on a shaft carried in a suitable bearing bracket 14, which is, in turn, bolted to the supporting member 15, which, together with the supports 13, is carried on a suitable base 16. The surface of the gauge 17 is, likewise arranged normal to the axes of the tubes to be cut. The tubes will be arranged in a horizontal row, as shown, and the members 10 and 11 then moved against the inclined saw and will have their ends cut at the desired angle and will all be of the same length.

From the above description it is seen that applicant has provided a means and method, by means of which the radiator tubes can be cut in large numbers and with great rapidity and yet will be properly cut as to length and end angle.

The apparatus disclosed is shown more or less diagrammatically and it will be understood that various changes may be made in the form, details and arrangement thereof without departing from the scope of applicant's invention, which, generally stated, consists in the matter shown and described and set forth in the following claims.

What is claimed is:

1. An apparatus for cutting a plurality of cylindrical members with their ends at an angle to their axes, comprising a holder for said members, a gauge having a flat gauging surface of sufficient extent to be contacted by all said members extending substantially normal to the axes of said members, and a cutting member, in relation to which the said holder is movably arranged, with its cutting edge inclined to the axes of the cylindrical members at the desired angle of cut.

2. A device of the class described having in combination, movable means for holding a plurality of cylindrical members in a row adjacent to each other, a gauge member against which all of said members are placed having its gauging surface normal to the axes of said cylindrical members, a cutting element having its cutting edge in a plane inclined to the axes of said members and means for guiding said holder relatively to said saw to sever the members.

3. The structure set forth in claim 2, said gauge being adjustable in the direction of the axes of the cylindrical members.

4. An apparatus for cutting tubes with their ends at an angle to the axes having in combination a support, a table mounted thereon, a tube holder on said table for holding tubes arranged in a row, guiding means on said holder and table for guiding the holder for movement at an angle to the axes of said tubes, a gauge member movable with said tube holder and having a gauge surface normal to the axes of said tubes and contacted by all of said tubes, and a cutting element having its cutting edge arranged in a plane parallel to the direction of movement of said tube holder.

5. The method of cutting cylindrical tubes having their ends at an angle to their longitudinal axes which consists in holding said members in a row adjacent to each other, placing the ends of the same against a gauging surface extending normal to the axis thereof, and moving said members and gauge relatively to a cutting element having its cutting edge arranged in a plane inclined to the longitudinal axes of said members and in a direction parallel to said plane of the cutting edge to sever said members, whereby a plurality of members of uniform length and with both ends beveled are formed.

6. A device for cutting cylindrical members of equal length, having diagonal ends, from stock having one end already cut diagonally, comprising means for firmly holding a plurality of said cylindrical members in a row, a gauge member having a surface extending at right angles to the axes of said members and of sufficient area to be contacted by the ends of all of the members comprising said stock, a cutter operating in a plane disposed at the same angle to the axes of said member at which it is desired to cut the ends thereof, and means for causing relative movement of said members, holding means and cutter.

In testimony whereof I affix my signature in presence of two witnesses.

JOSEPH D. HARRIS.

Witnesses:
BEATRICE VON DREELE,
GILBERT H. LARSON.